United States Patent [19]

Heinrich et al.

[11] Patent Number: 4,805,082
[45] Date of Patent: Feb. 14, 1989

[54] REGENERATIVE TWO-QUADRANT CONVERTER

[75] Inventors: Theodore M. Heinrich, Murrysville; Colin D. Schauder, Murrysville Borough, both of Pa.

[73] Assignee: Westinghouse Electric Corp., Pittsburgh, Pa.

[21] Appl. No.: 168,062

[22] Filed: Mar. 14, 1988

[51] Int. Cl.$^4$ ............................................. H02M 7/155
[52] U.S. Cl. ........................................ 363/129; 363/37
[58] Field of Search ............... 318/376; 323/908, 35, 323/37, 45, 127, 128, 129, 138

[56] References Cited

U.S. PATENT DOCUMENTS

| | | | |
|---|---|---|---|
| 4,019,116 | 4/1977 | Klautschek | 363/37 |
| 4,086,621 | 4/1978 | Vukasovic | 363/37 |
| 4,376,296 | 3/1983 | Bhagwat et al. | 363/138 |
| 4,697,131 | 9/1987 | Schauder et al. | 318/762 |

*Primary Examiner*—Patrick R. Salce
*Assistant Examiner*—Jeffrey Starrett
*Attorney, Agent, or Firm*—C. N. Lorin

[57] ABSTRACT

In a voltage-source inverter system, wherein the commutation between static switches in the AC/DC converter in the regenerative mode is forced by a GTO or transistor device in series with an auxiliary thyristor in order to bring the current path to zero, a reactor of large inductance is inserted for improved operation in the forward and regenerative mode, but an additional thyristor is converted in unparallel to such reactor in order to neutralize the inductance when bringing the current to zero in the regenerative mode, and such additional thyristor is turned OFF by natural commutation when the next converter static switch is coming ON.

4 Claims, 9 Drawing Sheets

REGENERATIVE TWO-QUADRANT CONVERTER

The invention relates to constant and variable voltage voltage-source inverter systems, and to AC motor drives embodying such a voltage-source.

In the converter supplying power to the DC-link of a voltage-source inverter, there is a need for an inductance both as a means of reducing the harmonic content of the mains current at the AC power supply side, and to limit the rate of rise of a fault current in the event of a shoot-through among the thyristors of the converter bridge while in the regenerative mode. It is desirable to maximize the amount of inductance so inserted in the DC-link in order to have its full benefit. The invention, however, involves a voltage-source converter as described in U.S. Pat. No. 4,697,131 issued Sept. 29, 1987, wherein the regenerative mode an interruption of current is caused to happen at the time the converter thyristors are being commutated. With this particular type, a large inductance would hinder the commutation of the converter bridge static switches. The problem arises because the inductance prevents the converter current from being rapidly reduced to zero, as required for effective commutation from one set of switches to the next in the control sequence of the bridge.

The invention is particularly applicable to the converter power supply for a voltage-source inverter such as described in the afore-mentioned U.S. Pat. No. 4,697,131. For the purpose of describing the preferred embodiment of the invention, the afore-mentioned U.S. patent is hereby incorporated by reference.

SUMMARY OF THE INVENTION

The present invention assists the commutation between outgoing and incoming static switches in the sequence of conduction of the static switches of an AC/DC converter of the type described in the incorporated-by-reference patent, where a large inductance has been inserted in its DC-link. This is achieved by using a GTO device, or a transistor, to interrupt the main current, and by creating with an additional static switch a separate bypass for the inductance energy, so as to help build-up, and minimize the duration of, a zero-current condition in the bridge at the moment of commutation.

DESCRIPTION OF THE PREFERRED EMBODIMENT

Figure 1:
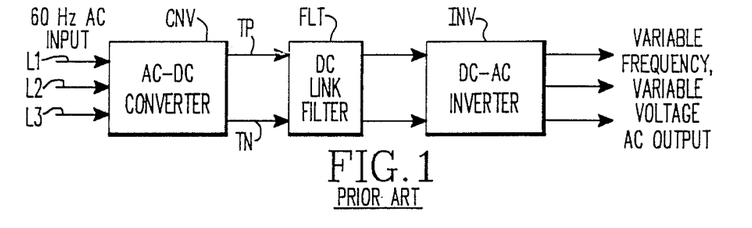
FIG. 1 is a block diagram of a variable frequency, variable voltage AC output system of the prior art.
Figure 2:
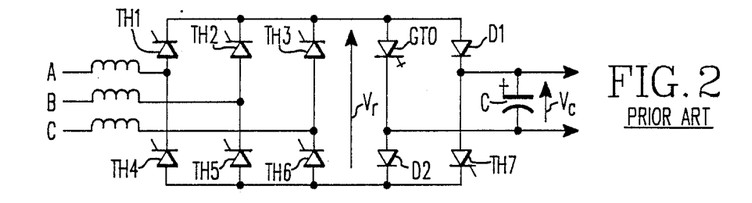
FIG. 2 shows the AC-DC converter used in the system of U.S. Pat. No. 4,697,131, which is part of the preferred embodiment of the invention.

FIG. 1 shows a voltage-source inverter including: a 60 Hz AC power supply (mains L1, L2, L3); an AC/DC converter CNV rectifying the AC current; a DC-link filter (including an inductor and a capacitor) FLT and a DC/AC inverter INV generating a variable frequency, variable output voltage, which can be used, for instance, to drive an AC motor coupled to a load. This is known as the forward mode of operation. With such a system, there is the possibility that the system be in a regenerative mode, namely when the load is operating as a generator returning energy back to the AC side through the inverter, the DC-link and the AC/DC converter. PWM inverters with a constant-voltage DC-link are commonly used in AC motor drives systems. Low performance drives may not require power to be returned to the AC mains whenever the motor operates in the regenerative power quadrants. In such case, the DC-link power is supplied from a simple rectifier bridge and regenerative power is dissipated in a resistor inserted across the DC-link when necessary. However, for high-performance servo drives or drives with very high inertia, the regenerated power has to be returned to the mains in order to improve the overall efficiency of the drive. Regenerative two-quadrant power systems have been conceived to convert an AC power supply from the mains into a constant DC-link voltage. FIG. 2, borrowed from U.S. Pat. No. 4,697,131, shows such a system. In order to accommodate for the operation in the regenerative mode, a GTO device and an auxiliary thyristor TH7 have been connected between the DC terminals of the thyristor bridge of the AC/DC converter and the capacitor which is across the inverter, in such a manner as to allow control of the converter continuously in either modes of operation, and to facilitate in the second mode the return of energy to the AC input side under the proper voltage in the DC-link in magnitude and polarity, while exercising forced commutation. In the regenerative mode, the GTO device when controlled for conduction concurrently with thyristor TH7, steers the current from the DC-link, thus removing energy from the capacitor (C) and returning it to the mains (A, B, C) through the inverted polarity terminals (TP, TN). Then, the GTO is turned OFF, thereby creating a zero-current period. This is the time chosen for thyristor commutation in the converter. The GTO device and auxiliary thyristor TH7 are triggered again with the new combination of main thyristors. This is according to the incorporated by reference U.S. Pat. No. 4,697,131, and it is understood that although a GTO device has been used in the description, any device which can be triggered for conduction and out of conduction, a transistor for instance, will do in place of the GTO device.

Figure 3:
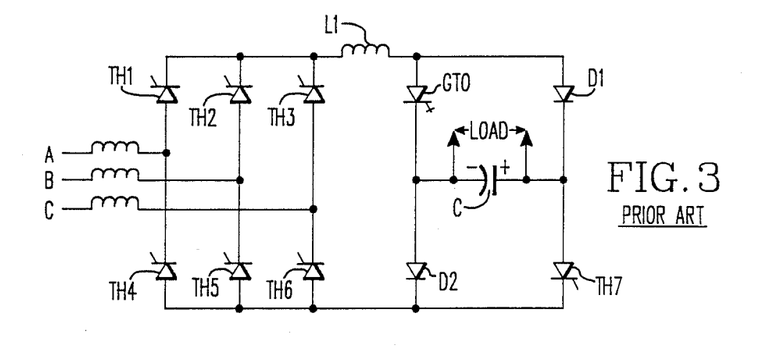
FIG. 3 shows the use of an inductance in the DC-link of the converter of FIG. 2, such use being the cause of the problem to be solved according to the present invention.

It is now proposed to insert, as shown in FIG. 3, a large inductance L1 as DC filter reactor, without affecting the power circuit commutation adversely and while affording at the same time fault protection. The insertion of inductance L1 improves the mains current waveform when the converter is operating at maximum constant voltage output, and it also works favorably in the instance of a variable output voltage as typified by the converter to an adjustable voltage six-step inverter. The six-pulse converter bridge is shown in FIG. 3 to include an inductance L1 in series, as desirable to reduce the harmonic content of the mains current and to limit the fault current in the event of a shoot-through in the bridge while in the regenerative mode. This effect could be maximized by introducing as much inductance as it is economically justifiable. Such a high inductance, however, has a negative effect on the commutation process, and with a system such as shown in FIG. 3, it would paralyze the operation in the regenerative mode. The commutation loop forms a series path through the mains with the two thyristors under conduction in the bridge, via inductance L1, diode D1 and the auxiliary thyristor TH7. If the inductance is too large, the current in this path will not be reduced to zero within the predetermined time interval allowed for the commutation and for the recovery of the devices. A fault will occur upon triggering of the subsequent combination of thyristors in the bridge. Still, a high inductance is especially desirable for high performance servo drives and variable speed drives with very high energy inertia where the return of regenerative power to the mains supply is essential for overall efficiency. Power circuits operating as a regenerative two-quadrant converter to convert an AC mains supply to a constant DC-link voltage have been disclosed in the prior art, one of them is the object of the afore-mentioned U.S. Pat. No. 4,697,131 and the basic circuit is as shown in FIG. 2. The addition of the inductance L1 at the location shown in FIG. 3 having a detrimental effect on the commutation unless L1 is limited, other locations might be considered. They are also impractical. One location is in series with the AC supply lines. In such case, the inductance is still in the commutation loop for regeneration, and in addition it hinders the commutation in the forward mode while affording no extra shoot-through protection and necessitating additional voltage regulation under load. Another location for the inductance is in series with the DC-link capacitor. Unfortunately, this means that since the circuit branch containing the capacitor is electrically disconnected from the mains during the commutation period in the regenerative mode, the inductor current would have no freewheel path and overvoltages would develop with destructive effect.

Figure 4:
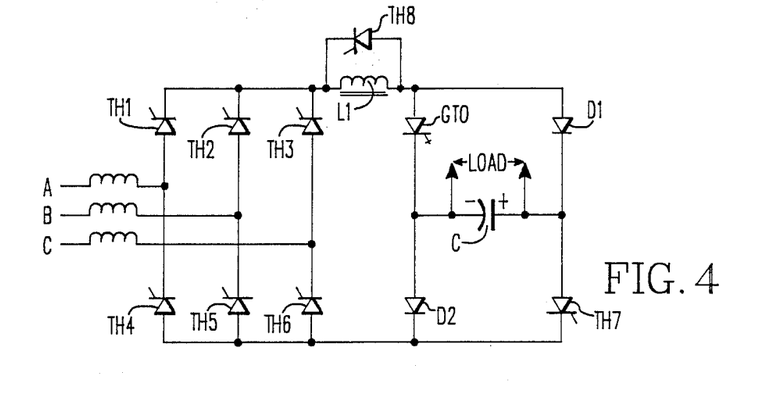
FIG. 4 illustrates the improved version of the converter of FIG. 3 in accordance with the present invention.

The solution is illustrated by FIG. 4 where a large inductance is placed in series with the output of the thyristor bridge like in FIG. 3 with the provision of an additional thyristor TH8 connected in parallel with the inductance L1 and strategically triggered to remove the influence of the inductance from the commutation loop when in the regenerative mode, by providing a freewheel path for the inductance current.

Figure 5A:
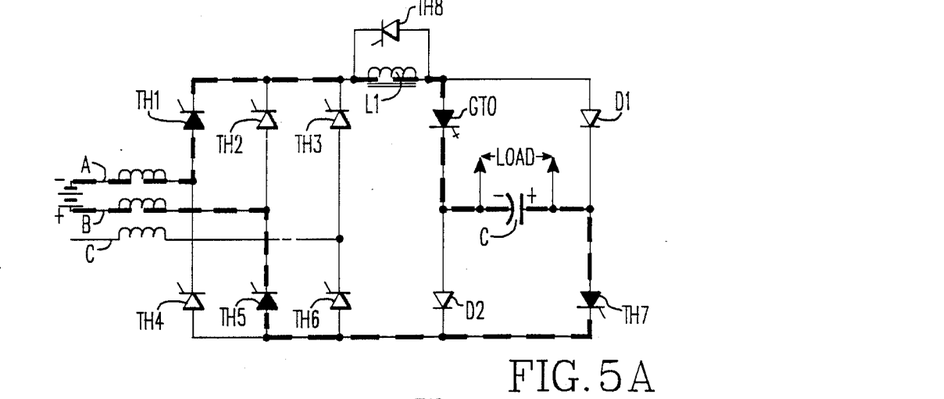
FIGS. 5A to 5F illustrate the current paths involved in the successive steps of operation of the circuit of FIG. 4 during commutation of two of the main thyristors.
Figure 5B:
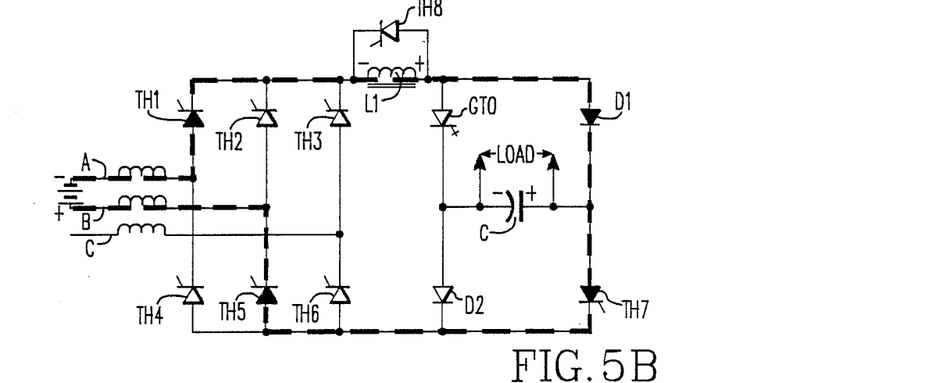
Figure 5C:
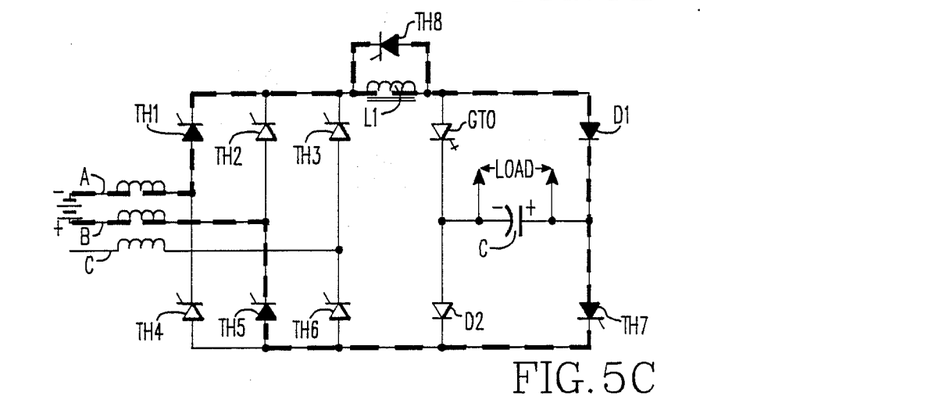
Figure 5D:
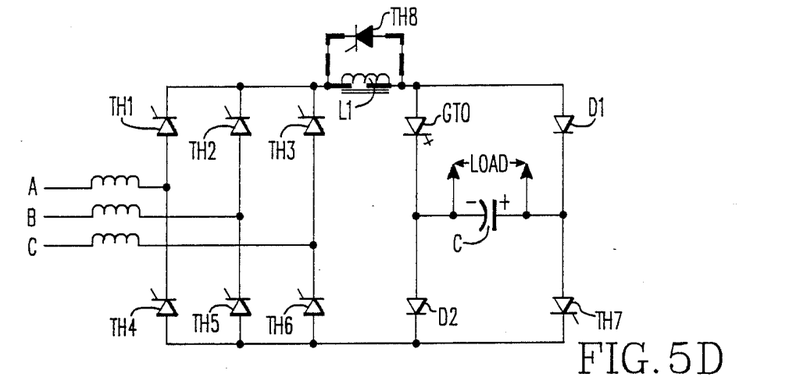
Figure 5E:
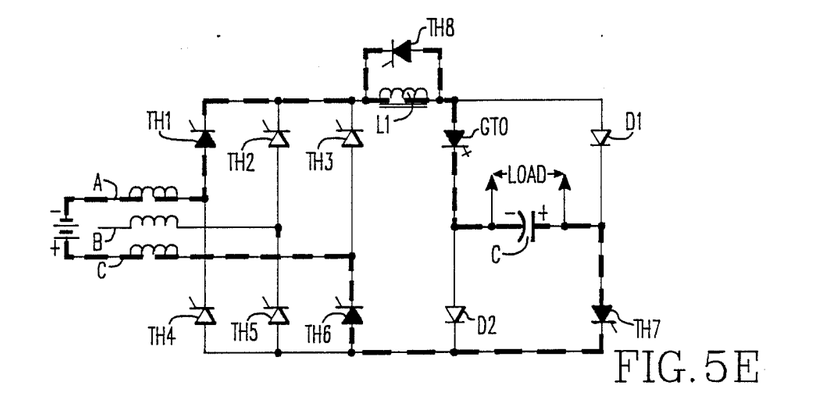
Figure 5F:
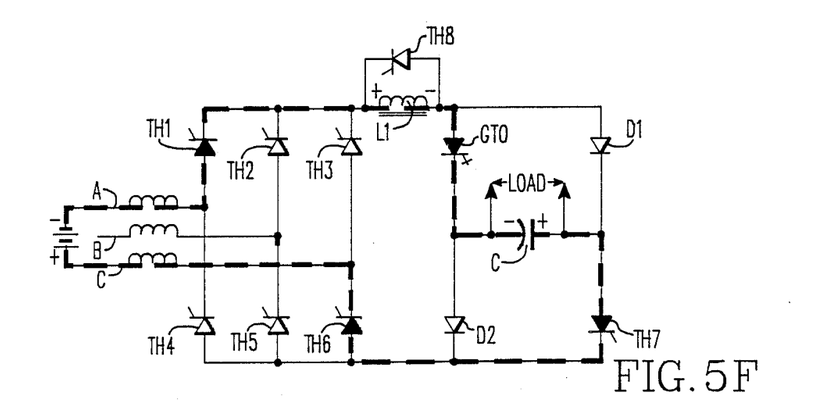

FIGS. 5A to 5F illustrate the current paths involved in the regenerative mode during the successive steps of the commutation of thyristors TH5 and TH6 for the negative DC-link terminal TN and under thyristor TH1 for the other DC-link terminal TP. The operation of the GTO with respect to thyristors TH1 to TH6 and to auxiliary thyristor TH7 is the same as explained in the incorporated by reference patent by reference to FIGS. 10A to 10D there. The additional thyristor TH8 is triggered immediately upon each turning OFF of the GTO, which initiates the commutation. Thus, as shown in FIG. 5A the GTO is passing current flowing through inductance L1 via TH7 from phase A and thyristor TH1 to phase B and thyristor TH5 when, at the start of the commutation, the GTO is turned OFF (FIG. 5B) causing this current to rapidly divert to a new path involving inductance L1, diode D1 and thyristor TH7. Immediately thereafter, if not concurrently, the additional thyristor TH8 is triggered (FIG. 5C). From then on, the polarity of the mains tends to reduce the commutation loop current while the polarity of the mains voltage biases TH8 to keep it ON, so that current starts to build up through TH8 in a freewheel action, as shown in FIG. 5C. This means that inductance L1 is practically neutralized as seen from the commutation loop. The rate of change of the current in the commutation loop is not affected by the inductance. The current falls rapidly under the forced commutation effect of the GTO, the action of the commutating mains voltage despite the remaining inductances in the loop, which are in fact very small. Finally, the commutation loop current is reduced to zero (FIG. 5D), while nearly the entire original current in the inductance L1 is freewheeling through the additional thyristor TH8. Given some recovery time, the devices which are next in the sequence of the bridge (TH1 and TH6) are triggered together with the GTO and the auxiliary thyristor TH7 (FIG. 5E). The supply current rises rapidly to a value matching the current circulating in the inductance L1, and exceeds it under the forcing difference between the voltage on capacitor C and the mains voltage. Now, the voltage across L1 biases TH8 OFF under natural commutation. Inductance L1 is operative again within the bridge current loop (FIG. 5F) until another commutation in the sequence repeats with the GTO and thyristor TH8 the same process, thus, for each commutation in the regenerative mode.

In the forward mode, TH8 is never triggered and the effect of the large inductance L1 is felt all the way in the circuit. It is observed that a diode instead of a thyristor at TH8 would not do because the diode would only allow L1 to be "seen" by the power circuit under conditions where the circuit current is in the process of rising. When the circuit current would be falling, as under the action of the converter voltage ripple or by dynamic control action, the effect of L1 would be lost as soon as the inductance current would begin to freewheel through the diode.

Figure 6:
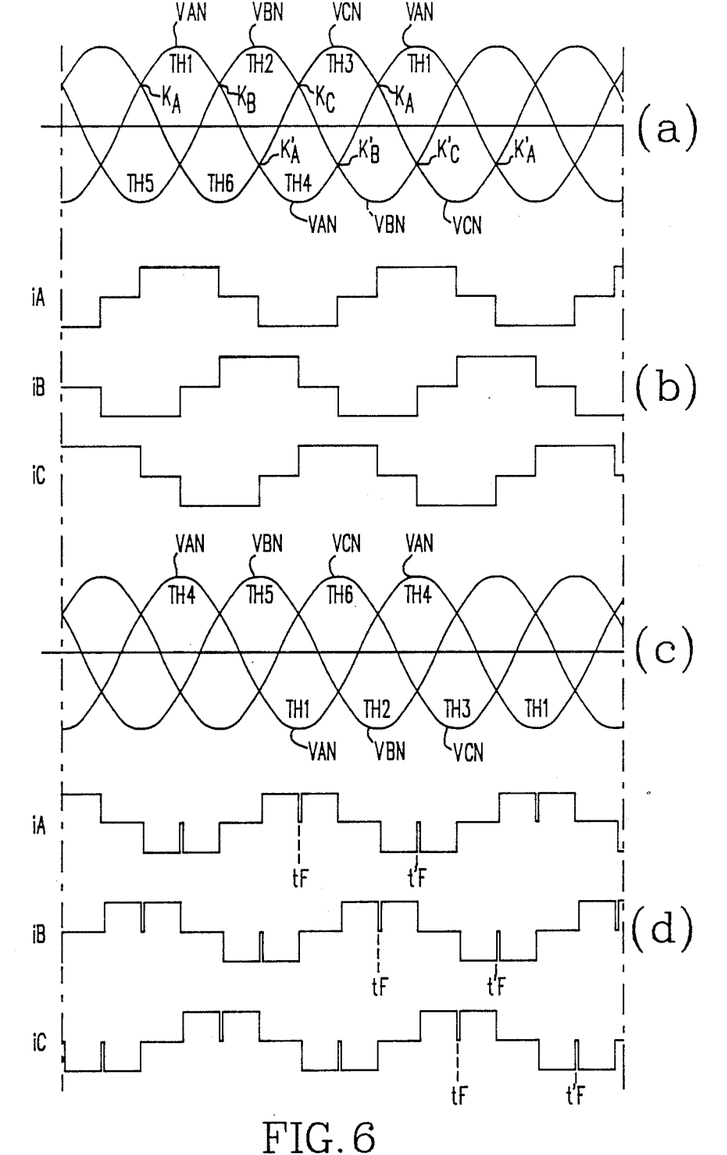
FIG. 6 illustrates with curves the operation of the circuit of FIGS. 4 and 5A to 5F.

Referring to FIG. 6, the line-to-neutral voltages VAN, VBN and VCN applied to the converter bridge for the three input phases A, B, C, are shown under (a). Assuming full positive voltage operation in the forward mode under zero firing angle for the thyristors, currents iA, iB and iC are shown under (b). Ideally, assuming a constant DC current being outputted, the input currents have a perfect square shape. This is where the large inductance is very effective in establishing DC output current and in eliminating any ripple which could otherwise appear in the input current waveform. Under (c) are shown the voltage-to-neutral voltages and the outputted voltage at 180° firing angle for full voltage negative, as required for the regenerative mode. Ideally the currents iA, iB and iC would be of similar shape as for the forward mode, except for the 180° phase shift. However, the effect of the large inductance L1 is neutralized during the commutation period which is illustrated by a notch caused in the current when the GTO is switched OFF and TH8 is switched ON. This is shown at instants such as tF and t'F for the respective opposite polarities.

Figure 7:
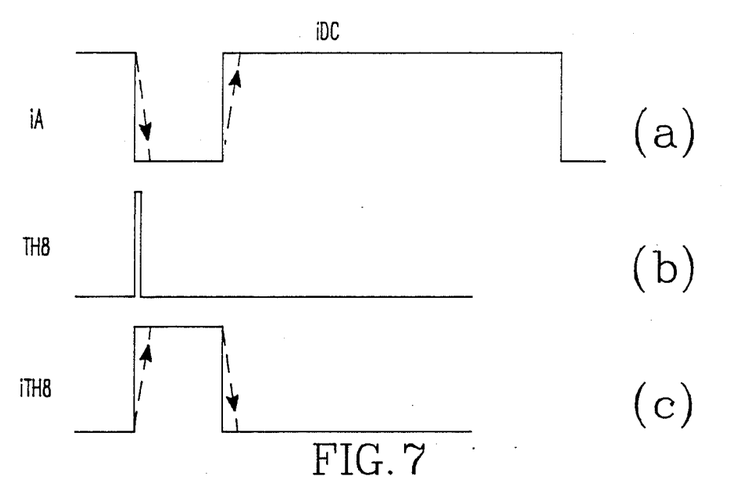
FIG. 7 is an enlarged view of the notch shown in FIG. 6, to illustrate the effect of the neutralization of the inductance during the commutation period.

The effect of an idealized notch is illustrated in FIG. 7 for current iA, under (a). The notch is initiated by the interruption of the conduction of the GTO and by the concurrent triggering of the additional thyristor TH8 as shown under (b). At that moment, as shown in dotted line, the current iA decreases very rapidly. The offgoing bridge thyristor is turned OFF. At the same time, by complementary action, the freewheel current iTH8 is building up quickly, also as shown in dotted line under (c). Then, the GTO device is again triggered for conduction. This occurs concurrently with the auxiliary thyristor TH7, causing the rising edge of the notch, turning OFF the additional thyristor TH8 by natural commutation, causing iTH8 to decrease rapidly as shown under (c), at the same time as firing of the subsequent thyristor in the converter bridge is triggered. As the freewheel current iTH8 is vanishing, the bridge current iA reaches quickly the level shown for iA under the idealized condition assumed for the purpose of illustration. In other words, the freewheel current when it ends under natural commutation of TH8 will divert back to the mains lines and the effect of the large inductance will be restored. Therefore, beyond the notch of the current iA, any sharp ripple will be forced by the inductance to follow more or less closely the basic square shape of the current.

Figure 8A:
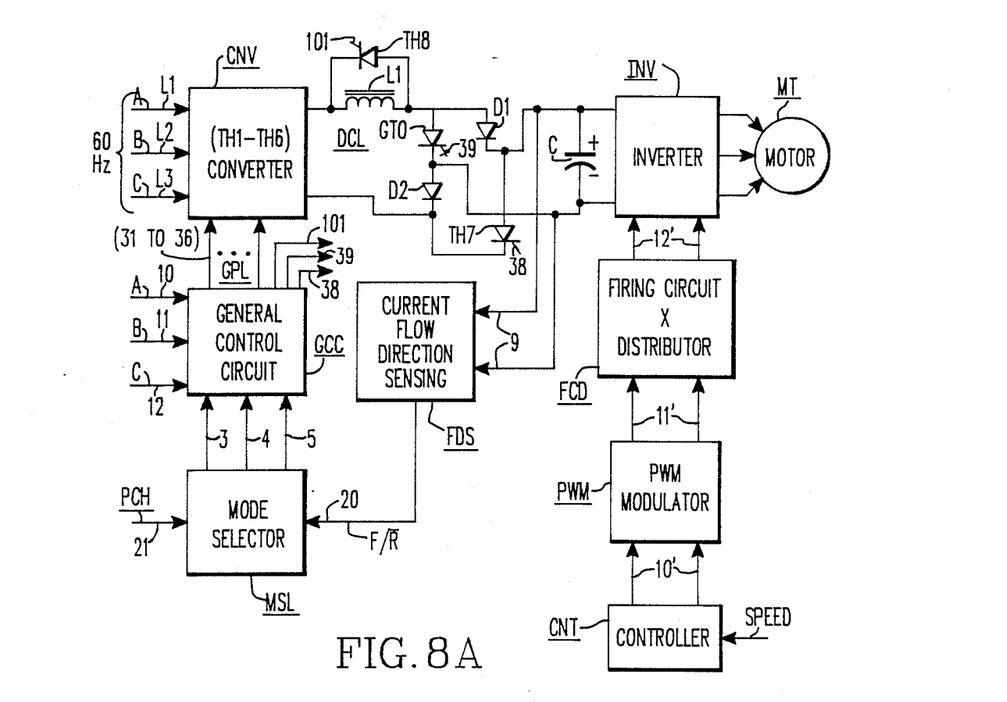
FIGS. 8A, 8B and 8C show in block diagram a gating control circuit as can be used for effecting the operative steps of FIGS. 5A to 5F.
Figure 8B:
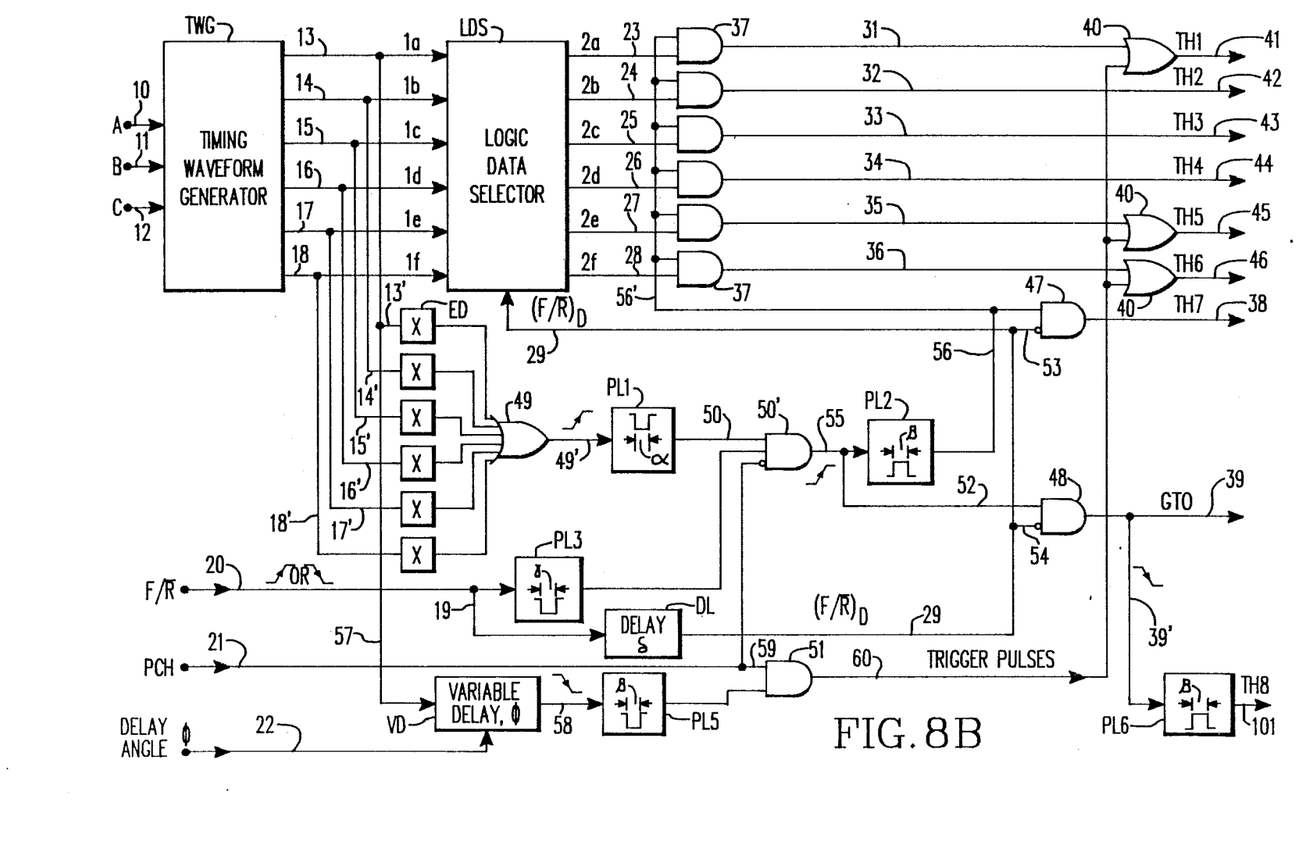
Figure 8C:
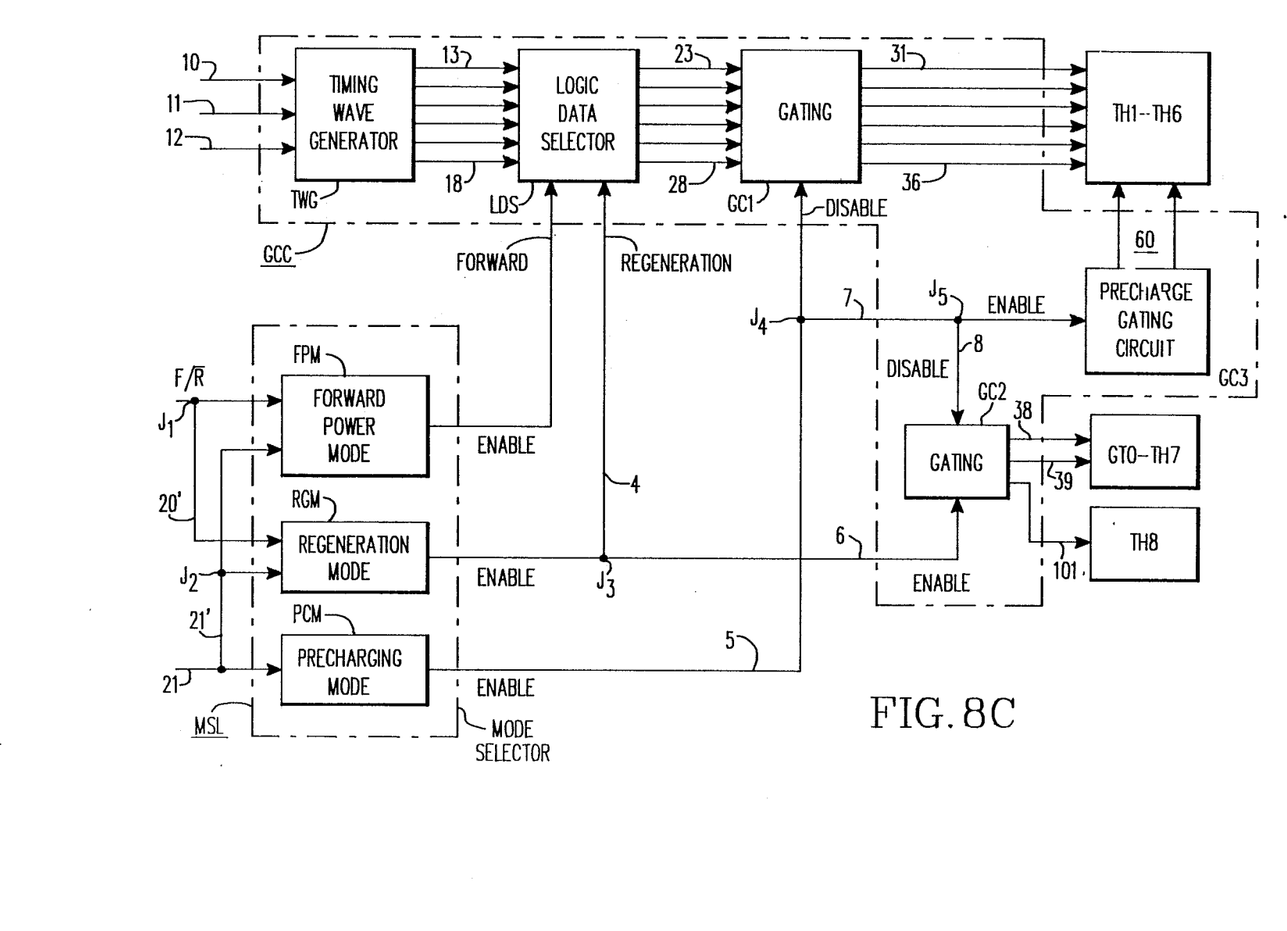

FIGS. 8A, 8B and 8C correspond to FIG. 11A, 11B and 11C of the incorporated by reference patent, with the exception that the generation of the triggering signal for additional thyristor TH8 has been added with the output line 101 thereto.

FIG. 8A shows a motor drive having a static converter CNV, a DC-link DCL and an inverter INV with the commutation circuit improved as in FIG. 4 by the provision of a large inductance Ll and a thyristor TH8 controlled from line 101 when the GTO is controlled by line 39 and the auxiliary thyristor TH7 is gated by line 38. These three control lines are effective only when the system is in the regenerative mode, namely when current flow sensing by circuit FDS detects the change of mode and a signal of logic F/R imposes via line 20 the corresponding control mode for line 31 to 36 to the bridge thyristors TH1 to TH6 and renders effective lines 101, 39 and 38. FIG. 8A otherwise is as FIG. 11A of the incorporated by reference patent.

Figure 9:
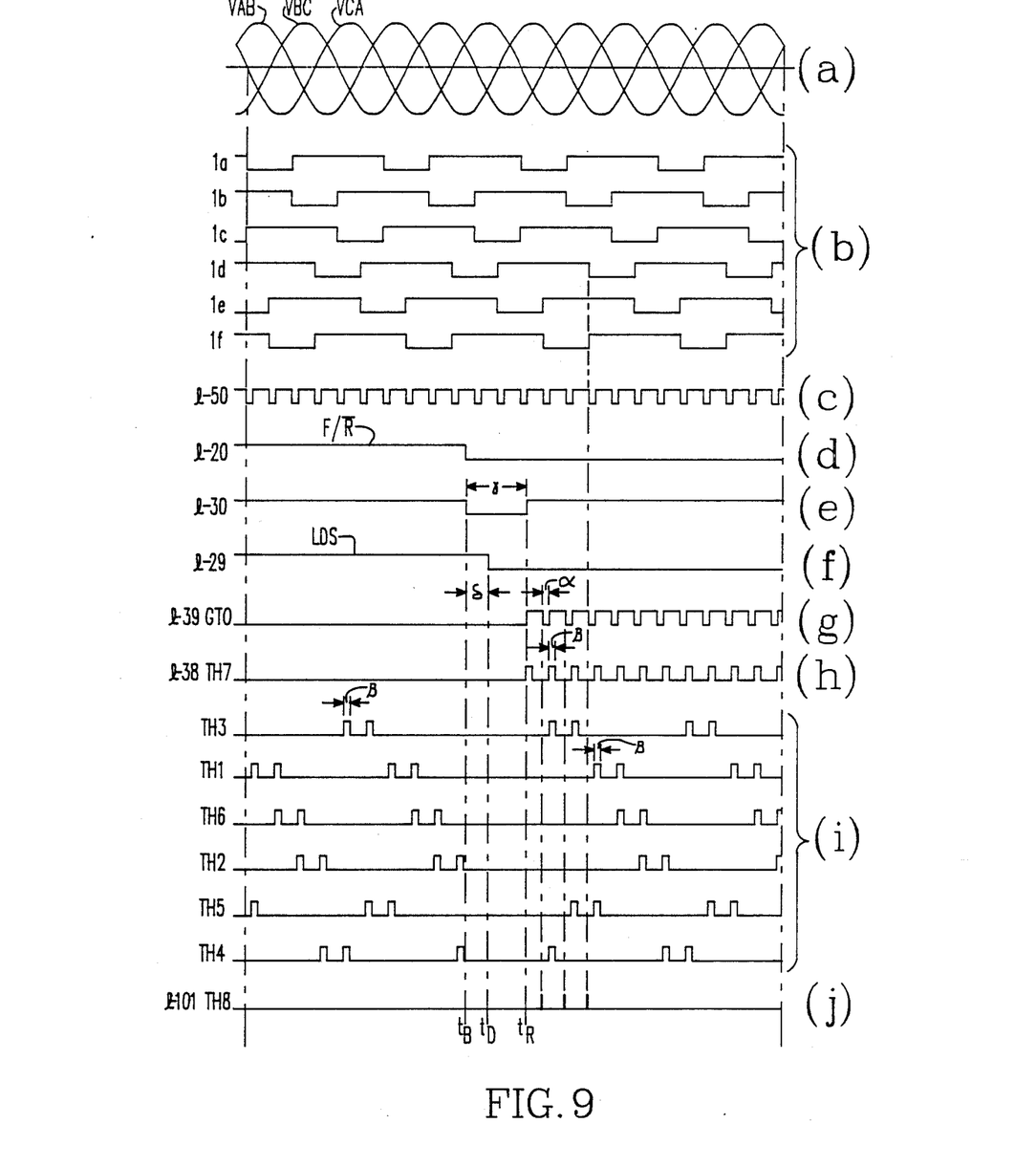
FIG. 9 shows curves which indicate the timing waveforms, the mode selecting signals and the gating pulses used in the gating control system of FIG. 8C.
Figure 10:
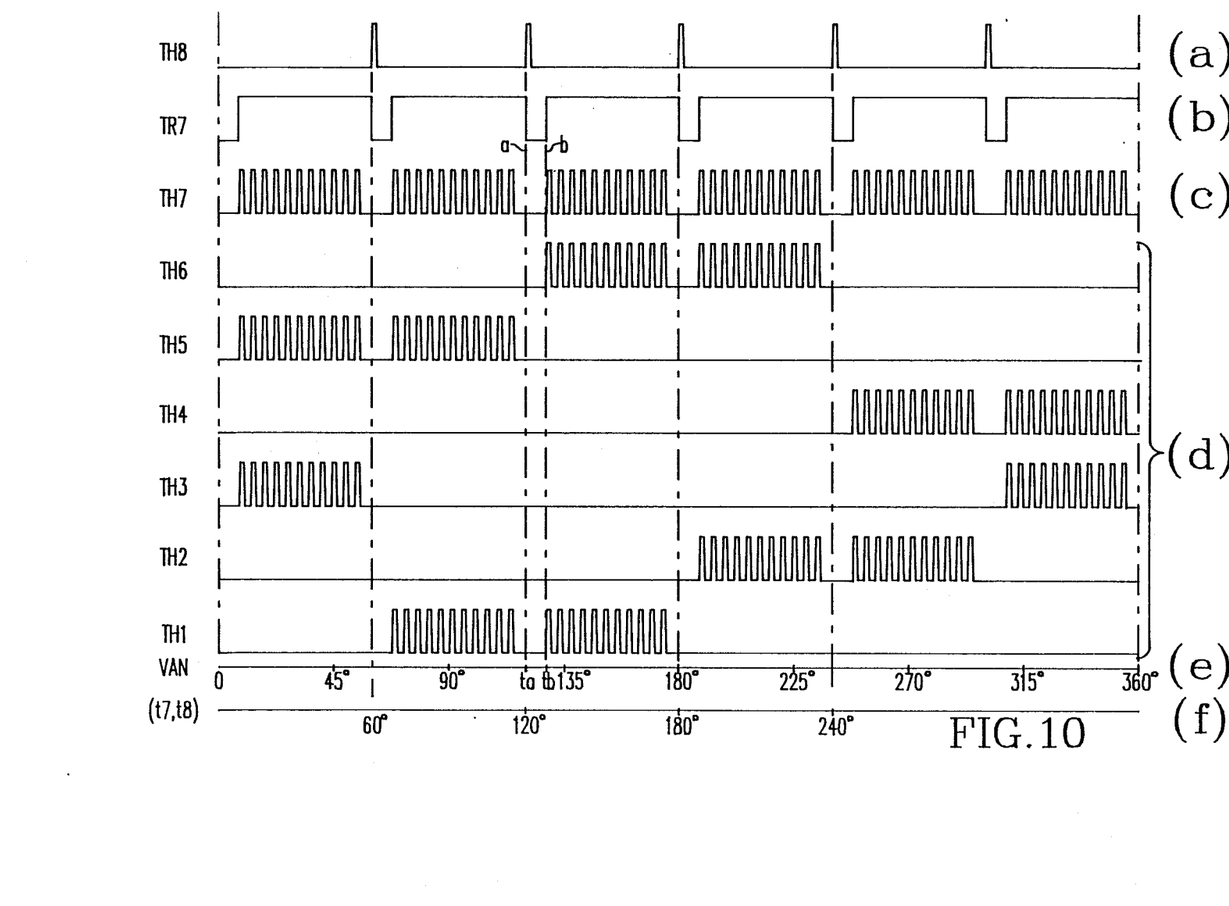
FIG. 10 shows with curves the generation and the timing of the pulses controlling the static switches in the preferred embodiment of the invention.

FIGS. 8B and 8C are like FIGS. 11B and 11C of the incorporated by reference patent, except that the occurrence of the triggering pulse for thyristor TH8 and line 101 carrying such pulse, have been indicated on the respective drawings. As shown in FIG. 8B, a pulse generator PL6 is provided, responding to the triggering pulse of line 39 for the GTO device, which generates the pulse of line 101 triggering the additional thyristor TH8. The controlling signals of lines 31 to 36, 38, 39 and 101 have been placed together in time relation in FIG. 9 where the thyristors TH1 to TH7 each receive a hard pulse for triggering. The occurrence of the signals of line 39 (GTO), line 38 (TH7) and line 101 (TH8) and the ensuing notch of interruption for the current path are shown repeatedly applied upon each commutation step after shifting to the regenerative mode. FIG. 10 is like FIG. 9 showing the regenerative mode where the thyristors are being controlled with a picket fence series of pulses rather than a mere hard pulse for gating.

The proposed scheme allows the generation of mains currents which are approaching the theoretical optimum, or quasi-square wave form, shown in FIG. 6. The additional thyristor TH8 has an extremely short duty cycle and can be rated accordingly, although it should be chosen so as to be able to handle the peak power current for short periods (see FIG. 7). The improved two-quadrant converter makes possible operation with inverters requiring a variable DC-link voltage. In such case, the large sixpulse ripple occurring when firing the devices away from the theoretical front or backstops of phase shift make it absolutely essential that a large inductance be given the filter reactor. In situations where the equipment accepts a relatively small inductance, the improvement due to more inductance and the additional thyristor TH8 will be felt at least in the regenerative mode.

We claim:

1. In an AC/DC converter system including an AC bridge having a plurality of static-controlled switches controlled sequentially for conduction across DC-link terminals operative as a DC voltage source and connected to a load, with a capacitor across said DC-link terminals and the load, the system operating in one of a forward and a regenerative mode; the combination of
   a reactor and a GTO device in series between one terminal of the bridge and a corresponding end of said capacitor;
   an auxiliary thyristor connected in series with the other end of said capacitor and the other terminal of the bridge;
   a rectifying device connected between said reactor and said other end of said capacitor;
   an additional thyristor connected in parallel with said reactor and in opposition to said GTO device, to said rectifying device and to the bridge thyristors of the associated terminal;
   said GTO device being controlled for conduction together with the bridge thyristors under conduction in the control sequence thereof so as to form a current path via said reactor, said capacitor, the load, and via said auxiliary thyristor;
   said GTO device being controlled in the regenerative mode for interrupting said current path and said additional thyristor being controlled concurrently for conduction to create a freewheeling current path for said reactor upon commutation of successive bridge thyristors for conduction in the sequence thereof, thereby to allow a zero-current condition under regeneration from the load.

2. The system of claim 1 with said rectifying device diverting the current path directly to said auxiliary thyristor upon current interruption by said GTO device, and said auxiliary thyristor becoming non conductive by natural commutation under said zero-current condition.

3. The system of claim 2 with said GTO device being controlled for conduction after said zero-current conduction concurrently with control of the bridge thyristors next in the conduction sequence, and said additional thyristor being concurrently turned-OFF by natural commutation.

4. The system of claim 3 with said reactor having a substantially large reactance.

* * * * *